United States Patent
Sip

(10) Patent No.: US 8,248,026 B2
(45) Date of Patent: Aug. 21, 2012

(54) WIRELESS CHARGER AUTHENTICATION SYSTEM AND METHOD THEREOF

(75) Inventor: Kim-Yeung Sip, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

(*) Notice: Subject to any disclaimer, the term of this patent is extended or adjusted under 35 U.S.C. 154(b) by 551 days.

(21) Appl. No.: 12/541,179

(22) Filed: Aug. 14, 2009

(65) Prior Publication Data

US 2010/0270969 A1 Oct. 28, 2010

(30) Foreign Application Priority Data

Apr. 28, 2009 (CN) .......................... 2009 1 0301931

(51) Int. Cl.
H01M 10/44 (2006.01)
H01M 10/46 (2006.01)
(52) U.S. Cl. ....................................................... 320/108
(58) Field of Classification Search .................. 320/107, 320/108, 137
See application file for complete search history.

(56) References Cited

U.S. PATENT DOCUMENTS 7,728,548 B2 * 6/2010 Daynes et al. ................ 320/106
2009/0295326 A1 * 12/2009 Daynes et al. ................ 320/106

* cited by examiner

*Primary Examiner* — Edward Tso
(74) *Attorney, Agent, or Firm* — Altis Law Group, Inc.

(57) ABSTRACT

A wireless charger authentication system includes an electronic device and a wireless charger. The electronic device includes an emitting module configured for producing an unauthenticated signal and a modulating module configured for modulating the unauthenticated signal into a high-frequency signal. The wireless charger includes a source signal produced by a power supply, a mixing module, an analyzing module, a comparing module and a triggering module. The mixing module is configured for mixing the high-frequency signal and the source signal to get a recognized signal. The analyzing module is configured for analyzing the parameters of the recognized signal. The comparing module predetermines a number of preset parameter values and is configured for comparing the parameters with the preset parameter values. The triggering module is configured for triggering the wireless charger to charge the electronic device if the parameters of the recognized signal are substantially equal to the preset parameter values.

20 Claims, 4 Drawing Sheets

WIRELESS CHARGER AUTHENTICATION SYSTEM AND METHOD THEREOF

BACKGROUND

1. Technical Field

The present disclosure relates to wireless chargers and, particularly, to a wireless charger authentication system and method thereof.

2. Description of Related Art

As wireless chargers are getting more popular for electronic devices, such as smart phones, game consoles and PDAs, it is unavoidable that one wireless charger may be used to charge different electrical devices manufactured by differed manufacturers. When the wireless charger is compatible with different electronic devices, the wireless charger will charge the electronic device with high charging efficiency. However, when the wireless charger is not compatible with different electronic devices, the wireless charger will charge the electronic device with low charging efficiency and waste power.

Therefore, it is desirable to provide a wireless charger authentication system and method thereof, which can overcome or at least alleviate the above-mentioned problems.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
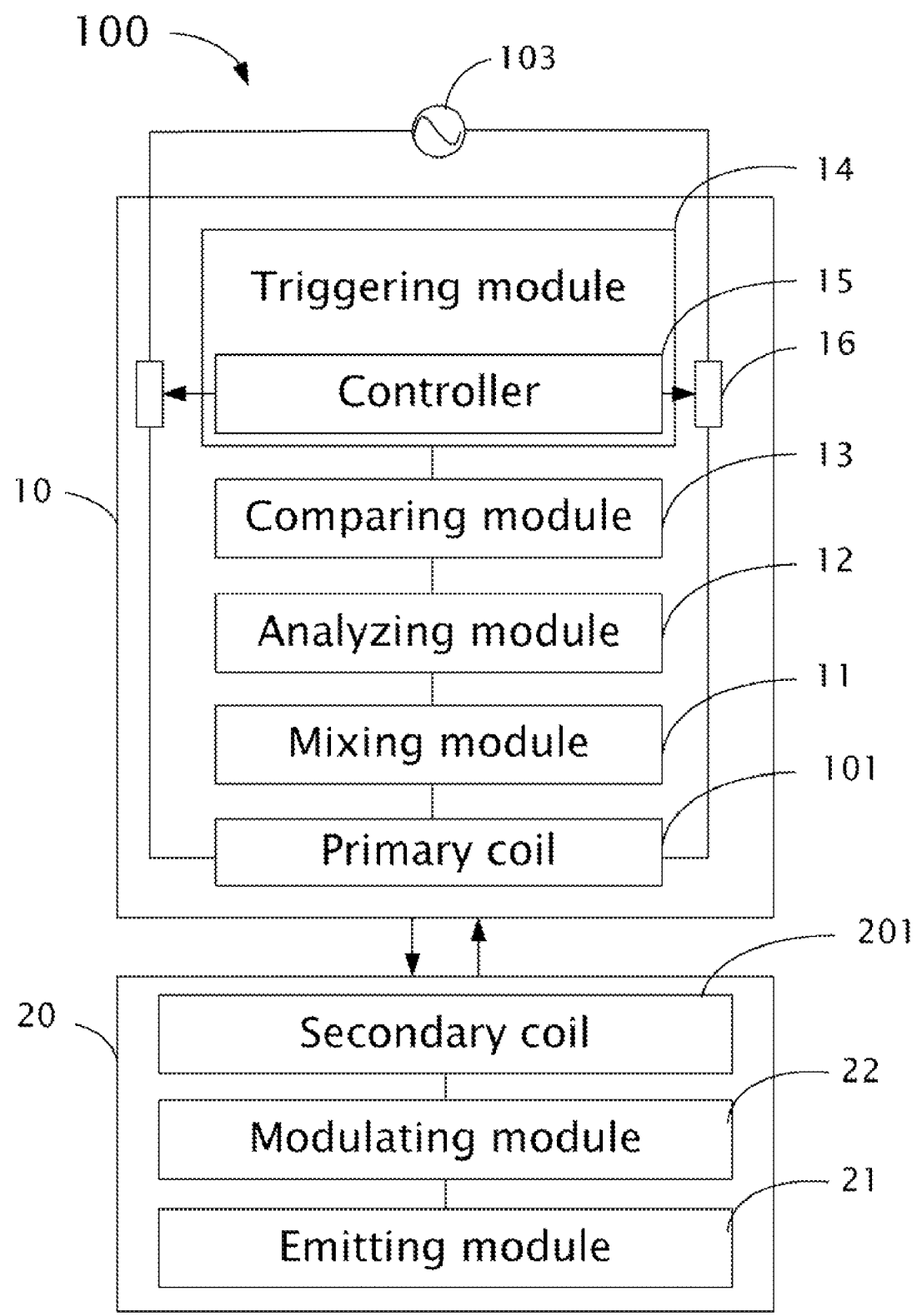
FIG. 1 is a functional block diagram of a wireless charger authentication system, according to a first exemplary embodiment.

Referring to FIG. 1, a wireless charger authentication system 100 includes a wireless charger 10 and an electronic device 20. The wireless charger 10 includes a primary coil 101, while the electronic device 20 includes a secondary coil 201 electromagnetically coupled to the primary coil 101 when the wireless charger 10 is engaged with the electronic device 20 to charge the electronic device 20. When a current applied on the primary coil 101 is not smaller than a chargeable current, the wireless charger 10 can charge the electronic device 20. In this embodiment, the electronic device 20 is a cell phone.

The electronic device 20 further includes an emitting module 21 and a modulating module 22.

Figure 2:
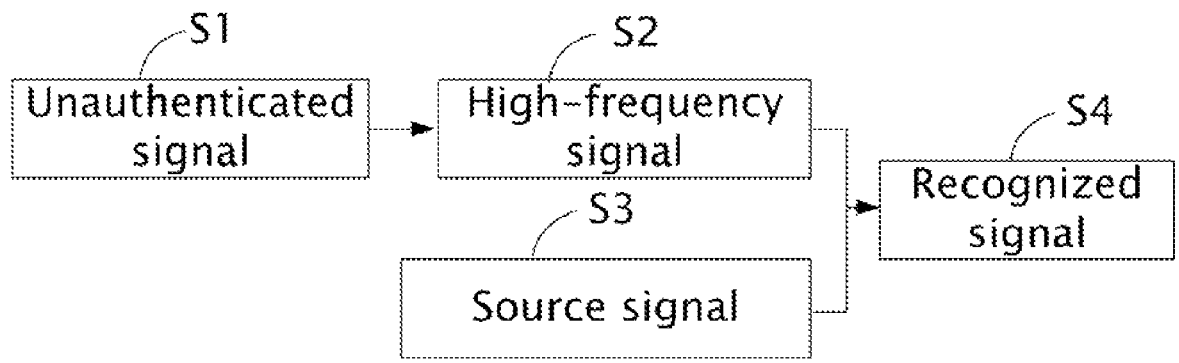
FIG. 2 is a signal transmitting block diagram of the wireless charger authentication system of FIG. 1.

Referring to FIG. 2, the emitting module 21 is configured for transferring an unauthenticated signal S1 to the modulating module 22. The unauthenticated signal S1 is a digital signal and is produced by transforming a specific code of the electronic device 20. In this embodiment, the specific code is a serial number by inputting "*#06#" with a keyboard of the electronic device 20.

The modulating module 22 is configured for modulating the unauthenticated signal S1 into a high-frequency signal S2 and transmitting the high-frequency signal S2 to the wireless charger 10 through the secondary coil 201 and the primary coil 101. In this embodiment, the modulating module 22 is a Quadrature Phase Shift Keying (QPSK). The high-frequency signal S2 includes a number of periodic impulse signals.

The primary coil 101 of the wireless charger 10 is electrically connected to an alternating current (AC) power supply 103. When the wireless charger 10 is supplied with power, current will flow in the primary coil 101 to form a source signal S3. The source signal S3 is a low-frequency periodic signal. In this embodiment, the frequency of the source signal S3 is 50 Hz. The wireless charger 10 further includes a mixing module 11, an analyzing module 12, a comparing module 13 and a triggering module 14.

The mixing module 11 is configured for mixing the high-frequency signal S2 and the source signal S3 to get a recognized signal S4. The recognized signal S4 is also a periodic signal because of the periodic characteristic of the high-frequency signal S2 and the source signal S3.

The analyzing module 12 is configured for analyzing the parameters of the recognized signal S4. In this embodiment, the analyzing module 12 is configured for analyzing an amplitude and a frequency of the recognized signal S4.

A number of preset parameter values are predetermined in the comparing module 13. The comparing module 13 is configured for comparing the parameters of the recognized signal S4 with the preset parameter values. In this embodiment, the preset parameter values include a preset amplitude value and a preset frequency value. The comparing module 13 respectively compares the amplitude and the frequency of the recognized signal S4 with the corresponding preset amplitude value and the corresponding preset frequency value.

The triggering module 14 is connected to the comparing module 13. The triggering module 14 is configured for triggering the wireless charger 10 to charge the electronic device 20 when the parameters of the recognized signal S4 are substantially equal to the preset parameter values. Otherwise, the wireless charger 10 does not charge the electronic device 20 when the parameters of the recognized signal S4 are different from the preset parameter values.

Furthermore, the triggering module 14 includes a controller 15 connected to the primary coil 101 in series with a variable resistance 16. The controller 15 and the variable resistance 16 are configured for increasing or decreasing the current of the primary coil 101 to determine whether the wireless charger 10 is to charge the electronic device 20 or not.

When the parameter of the recognized signal S4 is substantially equal to the preset parameter values, the controller 15 receives a signal from the comparing module 13 and controls the variable resistance 16 to decrease, and thereby increasing the current of the primary coil 101 to be equal to or greater than the chargeable current of the electronic device 20, thus the electronic device 20 can be charged by the wireless charger 10. When the parameter of the recognized signal S4 is different from the preset parameter values, the controller 15 controls the variable resistance 16 to increase, and thereby decreasing the current of the primary coil 101 below that of the chargeable current of the electronic device 20, thus the wireless charger 10 cannot charge the electronic device 20 normally and is maintained in an electricity-saving state.

Since the wireless charger 10 can authenticates and charges the electronic device 20 via a primary coil 101 and a secondary coil 201, and communicates with the electronic device 20 with a low current until it authenticates successfully, electrical power is saved.

Figure 3:
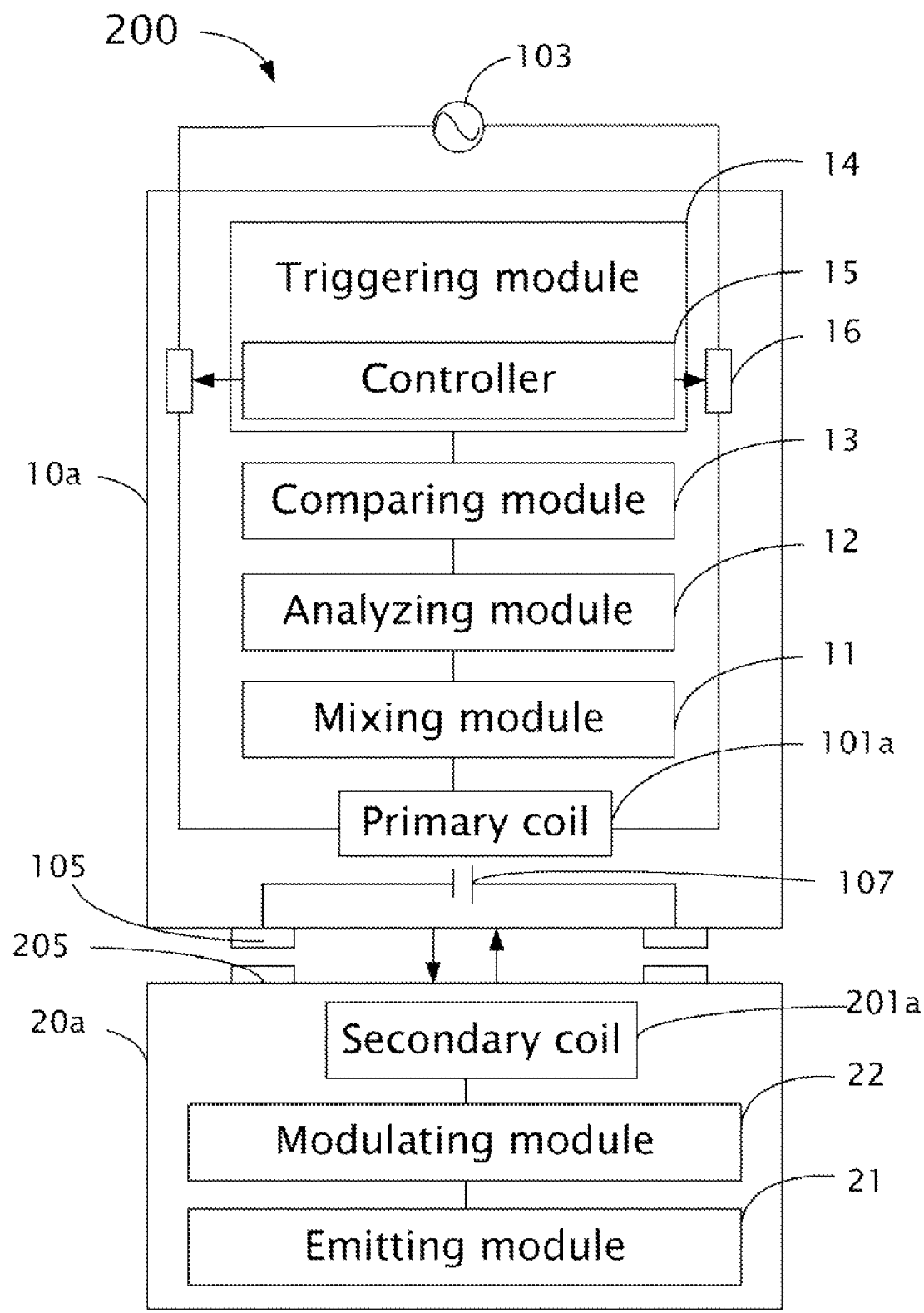
FIG. 3 is a functional block diagram of a wireless charger authentication system according to a second exemplary embodiment.

Referring to FIG. 3, a wireless charger authentication system 200, according to a second exemplary embodiment, is shown. The wireless charger authentication system 200 is similar to the wireless charger authentication system 100 of the first embodiment. In this embodiment, the wireless charger authentication system 200 includes a number of first holding coils 105 connected to a direct current (DC) power supply 107 and a number of second holding coils 205 electromagnetically coupled to the corresponding first holding coils 105. The first holding coils 105 are disposed around the primary coil 101a, while the second holding coils 205 are disposed around the secondary coil 201a. In this embodiment, the wireless authentication system 200 has four first holding coils 105 and four second holding coils 205. Other configurations of the wireless charger authentication system 200 is similar to the first embodiment, it is not described in detail.

When the wireless charger 10a is powered on and produced a direct current in the first holding coils 105, the four second holding coils 205 are attracted by the corresponding first holding coils 105, thereby the wireless charger 10a can hold on the electronic device 20a without the user applying any force.

Furthermore, the high-frequency signal S2 is transmitted to the wireless charger 10a by one of the four first coils 105 and one of the corresponding second coils 205 to be authenticated. In this way, the first coil 105 and the corresponding second coil 205 are optional, and the high-frequency signal S2 can be transmitted by another first coil 105 and another second coil 205 when one of the first and second coils 105, 205 is broken.

Figure 4:
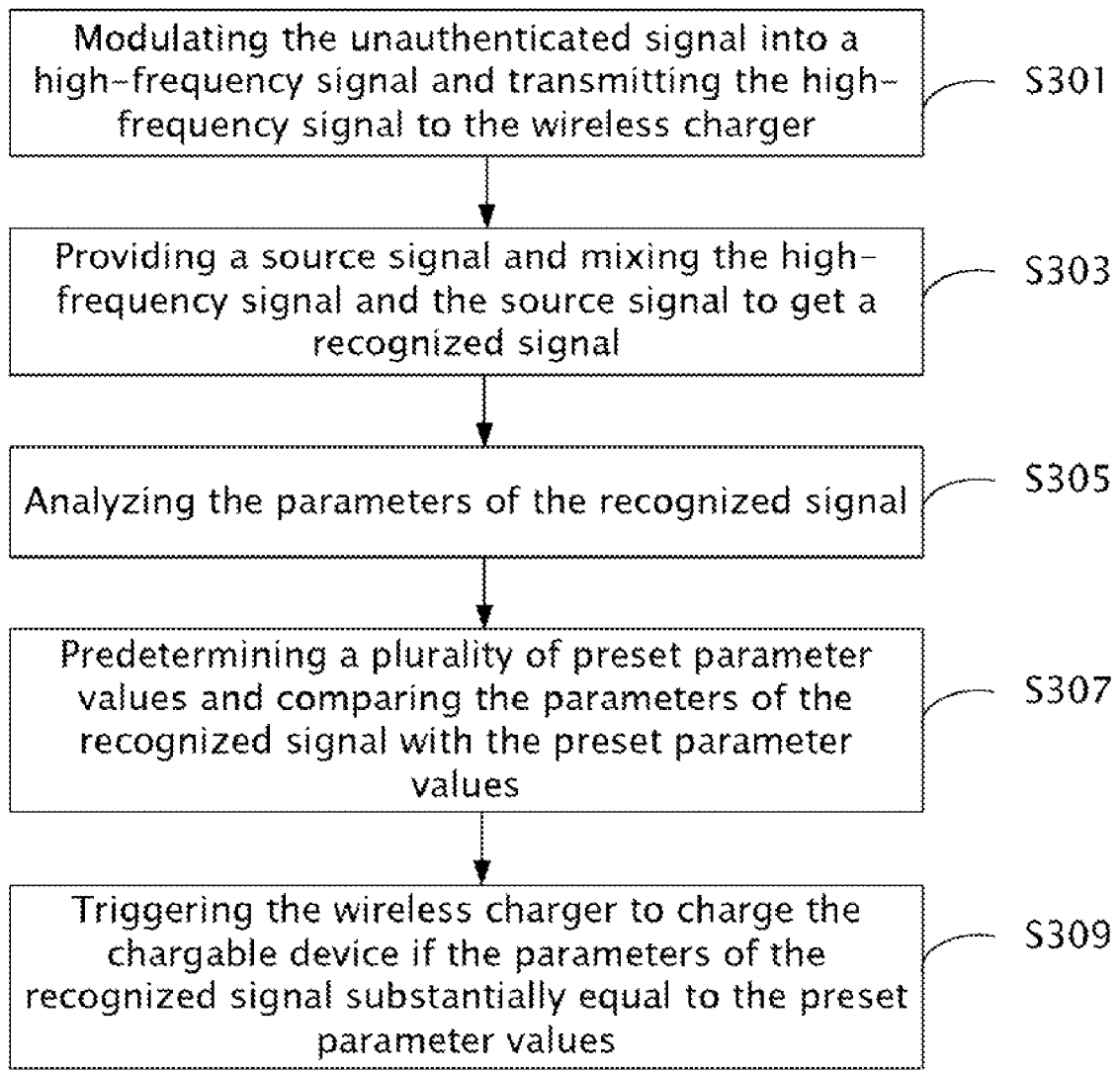
FIG. 4 is a flow chart of a wireless charger authentication method.

Referring to FIG. 4, a wireless charger authentication method used for the wireless charger authentication system 100 is shown. The method includes the following steps.

In step S301, the electronic device 20 modulates an unauthenticated signal S1 into a high-frequency signal S2 and transmitting the high-frequency signal S2 to the wireless charger 10 through the primary coil 101 and the secondary coil 201. The high-frequency signal S2 is composed of a number of periodic impulse signals.

In step S303, the primary coil 101 of the wireless charger 10 is electrically connected to the alternating current (AC) power supply 103. When the wireless charger 10 is supplied with power, current will flow in the primary coil 101 to form a source signal S3. The source signal S3 is a low-frequency and periodic signal. In this embodiment, the frequency of the source signal S3 is 50 Hz. The wireless charger 10 mixes the high-frequency signal S2 and the source signal S3 to get the recognized signal S4. In this embodiment, the recognized signal S4 is a periodic signal.

In step S305, the wireless charger 10 analyzes the parameters of the recognized signal S4. In this embodiment, the parameters of the recognized signal S4 include the amplitude and the frequency.

In step S307, a number of preset parameter values are predetermined in the wireless charger 10 and the wireless charger 10 compares the parameters of the recognized signal S4 with the preset parameter values. In this embodiment, the preset parameter values include the preset amplitude value and the preset frequency value corresponding to the parameters of the recognized signal S4. The wireless charger 10 respectively compares the amplitude and frequency of the recognized signal S4 with the preset amplitude value and the preset frequency value.

In step S309, the wireless charger 10 charges the electronic device 20 according to the compared results in step S307 or not. If the parameters of the recognized signal S4 are substantially equal to the preset parameter values, the wireless charger 10 charges the electronic device 20 by increasing the current of the primary coil 101. If the parameters of the recognized signal S4 are different from the preset parameter values, the wireless charger 10 does not charge the electronic device 20 by decreasing the current of the primary coil 101.

It will be understood that the above particular embodiments and methods are shown and described by way of illustration only. The principles and the features of the present invention may be employed in various and numerous embodiments thereof without departing from the scope of the invention as claimed. The above-described embodiments illustrate the scope of the invention but do not restrict the scope of the invention.

What is claimed is:

1. A wireless charger authentication system comprising:
    an electronic device comprising:
        an emitting module configured for producing an unauthenticated signal;
        a modulating module configured for modulating the unauthenticated signal into a high-frequency signal; and
    a wireless charger receiving the high-frequency signal and comprising:
        a source signal produced by a power supply;
        a mixing module configured for mixing the high-frequency signal and the source signal to get a recognized signal;
        an analyzing module configured for analyzing the parameters of the recognized signal;
        a comparing module having a plurality of preset parameter values therein and configured for comparing the parameters of the recognized signal with the preset parameter values; and
        a triggering module configured for triggering the wireless charger to charge the electronic device if the parameters of the recognized signal are substantially equal to the preset parameter values.

2. The wireless charger authentication system in claim 1, wherein the wireless charger comprises a primary coil, while the electronic device comprises a secondary coil electromagnetically coupled to the primary coil when the wireless charger charges the electronic device.

3. The wireless charger authentication system in claim 1, wherein the unauthenticated signal is a digital signal.

4. The wireless charger authentication system in claim 1, wherein the unauthenticated signal is produced by transforming a specific code of the electronic device, the specific code is a serial number of the electronic device which can be read by inputting "*#06#" with a keyboard.

5. The wireless charger authentication system in claim 1, wherein the modulating module is a QPSK.

6. The wireless charger authentication system in claim 1, wherein the high-frequency signal comprises a plurality of periodic impulse signals.

7. The wireless charger authentication system in claim 1, wherein the source signal is a low-frequency signal.

8. The wireless charger authentication system in claim 1, wherein the recognized signal is a periodic signal.

9. The wireless charger authentication system in claim 8, wherein the parameter comprises an amplitude and a frequency of the recognized signal.

10. The wireless charger authentication system in claim 9, wherein the preset parameter values comprise a preset amplitude value and a preset frequency value, the comparing module respectively compares the amplitude and the frequency of the recognized signal with the corresponding preset amplitude value and the corresponding preset frequency value.

11. The wireless charger authentication system in claim 1, wherein when the parameters of the recognized signal are different from the preset parameter values, the wireless charger does not charge the electronic device.

12. The wireless charger authentication system in claim 2, wherein the triggering module comprises a controller connected to the primary coil via a variable resistance for increasing or decreasing the current of the primary coil to determine whether the wireless charger is to charge the electronic device or not, and the controller can receive a signal from the comparing module.

13. The wireless charger authentication system in claim 12, wherein when the parameters of the recognized signal are substantially equal to the preset parameter values, the controller controls the variable resistance to increase the current of the primary coil, thus the electronic device can be charged by the wireless charger.

14. The wireless charger authentication system in claim 12, wherein when the parameters of the recognized signal are different from the preset parameter values, the controller controls the variable resistance to decrease the current of the primary coil.

15. The wireless charger authentication system in claim 1, further comprises a plurality of first holding coils connected to a direct current power supply and a plurality of second holding coils electromagnetically coupled to the corresponding first holding coils.

16. The wireless charger authentication system in claim 15, wherein the first holding coils are disposed around the primary coil, while the second holding coils are disposed around the secondary coil.

17. The wireless charger authentication system in claim 15, wherein the high-frequency signal is transmitted to the wireless charger by one of the first coils and one of the corresponding second coils to be authenticated.

18. A wireless charger authentication method comprising the steps of:
   modulating an unauthenticated signal into a high-frequency signal and transmitting the high-frequency signal to the wireless charger;
   providing a source signal and mixing the high-frequency signal and the source signal to get a recognized signal;
   analyzing the parameters of the recognized signal;
   predetermining a plurality of preset parameter values and comparing the parameters of the recognized signal with the preset parameter values;
   triggering the wireless charger to charge the electronic device when the parameters of the recognized signal substantially equal to the preset parameter values.

19. The wireless charger authentication method in claim 18, wherein the parameters of the recognized signal comprises an amplitude and a frequency, the preset parameter values comprise a preset amplitude value and a preset frequency value, and the method further comprises: respectively comparing the amplitude and frequency of the recognized signal with the preset amplitude value and the preset frequency value in the comparing step.

20. The wireless charger authentication method in claim 18, wherein if the parameters of the recognized signal are different from the preset parameter values, the wireless charger does not charge the electronic device.

\* \* \* \* \*